Figure 1:
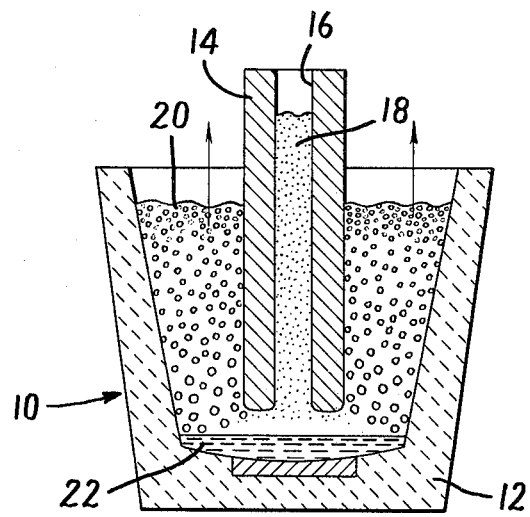

United States Patent [19]

Enger et al.

[11] 3,887,359

[45] June 3, 1975

[54] REDUCTION OF SILICON DIOXIDE BY MEANS OF CARBON IN ELECTRIC FURNACE

[75] Inventors: Rolf Enger, Oslo; Kristian Piene, Svelgen; Nils Skreien, Skedsmokorset; Audun Saethre, Oslo; Jan-Erik Thorslund, Nittedal, all of Norway

[73] Assignee: Elkem-Spigerverket A/S, Oslo, Norway

[22] Filed: Jan. 16, 1973

[21] Appl. No.: 324,114

[30] Foreign Application Priority Data
Jan. 25, 1972 Norway.................................. 173/72

[52] U.S. Cl..................................... 75/11; 423/350
[51] Int. Cl........................... C21c 5/52; C01b 33/02
[58] Field of Search........................... 75/10–12, 68; 423/350

[56] References Cited
UNITED STATES PATENTS

| | | | |
|---|---|---|---|
| 2,637,648 | 5/1953 | Udy | 75/11 |
| 3,215,522 | 11/1965 | Kuhlmann | 75/10 R |
| 3,704,114 | 11/1972 | Wilson | 75/10 R |
| 3,758,289 | 9/1973 | Wood | 75/10 |

*Primary Examiner*—L. Dewayne Rutledge
*Assistant Examiner*—Peter D. Rosenberg
*Attorney, Agent, or Firm*—Eyre, Mann & Lucas

[57] ABSTRACT

Silicon and silicon-containing alloys are produced in an electric furnace by reduction of silicon oxide with carbon wherein reaction gases pass through a portion of the charge rich in carbon to enhance furnace operation. According to the present invention, at least a major amount of the reaction materials of silicon dioxide and carbon are separated from each other in the furnace and as a result the reaction gases will pass through a portion of the charge rich in carbon which tends to react with the silicon and silicon oxide gas and hold these materials in the furnace. Better control of the course of reaction is achieved and inexpensive raw materials may be utilized in the process.

10 Claims, 5 Drawing Figures

REDUCTION OF SILICON DIOXIDE BY MEANS OF CARBON IN ELECTRIC FURNACE

The present invention relates to production of silicon and silicon-containing alloys in electric furnaces by reduction of silicon oxide with carbon reducing agents.

The known types of electric furnaces for this purpose are electrode furnaces with submerged electrodes. An approximate stoichiometric and homogeneous mixture of the raw materials is supplied to the furnaces from above. The metallurgical processes take place chiefly in the vicinity of the submerged electrode tips by supply of electrical energy.

In carrying out the process, silicon dioxide as for example in the form of quartz is reduced by carbon according to the overall formula: $SiO_2 + 2C = 2CO + Si$. It is known that the reaction can proceed through more steps and through more part-reactions. The reactions take place at elevated temperatures and some of the reactants are present in gaseous state, especially SiO and Si. The product is removed from the bottom of the furnace while CO-gas leaves the furnace through the raw material mixture in the upper part of the furnace.

Furnaces of today are quite sensitive to an overdose of quartz or reduction agents. In addition, there is a tendency to lose material in the form of $SiO_2$-dust in the off gases. This may often amount to at least 10 percent of the amount of quartz supplied in the charge. Apart from lost production, the loss of dust also pollutes the air which is a big drawback for the surrounding countryside. Purification of the off gases is technically difficult and an economical load.

The dust losses are chiefly due to the fact that SiO-gas and eventually Si-gas escape from the reaction zone and are oxidized by the oxygen of the air on the furnace top. Sudden blowings of such gases directly from the reaction zones to spots on the furnace top take place regularly.

The reason for these draw-backs is often that the raw material mixture does not possess sufficient permeability for gas. This can be due to products of condensation, poor thermal stability, and possible unfortunate conditions of reactivity or grain sizes.

These disadvantages may be reduced by careful control of the raw materials but this makes the product more expensive and even with good raw materials many plants find it difficult to maintain steady operations for long periods in furnaces which produce high silicon alloys.

The aim of the method according to the present invention is to reduce the loss of dust through the off gases, to allow utilization of cheaper raw materials and to obtain control of the course of reactions in the process. According to the present invention, this is achieved by separating at least a major amount of the reaction materials of quartz and carbon from each other in the furnace. As a result of the separation, the reaction gases must pass through a zone with high carbon content, so that the SiO-gas and eventually Si-gas can react with carbon and be captured and brought to the reaction zone with the carbon. A consequence of this is that the off gases from the furnace are normally let out through the carbon-rich part of the charge. In this way the demand for lump form and thermic stability in the quartz-rich part of the charge is of less importance. Due to condensation of SiO the possibility of gas transport through the quartz rich zone will soon be stopped independent of the quartz lump size.

Partial reduction of the $SiO_2$ of the raw materials to SiO gas is that part of the reaction which demands most energy. In accordance with the invention, $SiO_2$ is supplied chiefly in a zone of high energy as for instance near the tips of the electrodes. The produced silicon or alloys will normally be tapped from the lowest part of the carbon-rich zone in the furnace.

The drawings illustrate a number of preferred ways in which the quartz and reducing agent in the charge may be completely separated from each other in the furnace.

FIGS. 1 through 5 are plan views partially in cross-section to illustrate a number of preferred embodiments of the way in which the quartz and reducing agent in the charge may be separated from each other in the furnace in accordance with the present invention. In the drawings, like numerals refer to like parts whenever they occur.

For simplicity, the drawings illustrate furnaces with only one single electrode. It is possible to use alternating current as well as direct current for supply of energy to the process. In most cases it will be possible to utilize quartz sand instead of lump quartz. In many cases quartz sand will also be most appropriate as it is desirable that the quartz rich part of the charge should be gas tight so that all of the reaction gas and off gas will flow up through the zones with high carbon content. In general, it is of advantage to control the rate at which the quartz is fed into the furnace to have it correspond to the supplied amount of energy.

The materials and proportions of materials in the charge for producing silicon metal and silicon-containing alloys in electric furnaces are well known in the art and in accordance with the present invention the other metal oxides especially the iron oxides may be charged along with the quartz or with the separate carbon-rich portion of the charge. The materials and proportions of materials used in carrying out the present invention are otherwise those which are conventional in the art.

Turning to FIG. 1, the furnace 10 comprises a conventional pot 12 having an electrode 14 which is submerged in the charge and operated in conventional manner. In accordance with the present invention, electrode 14 is provided with an axial hole 16 that extends throughout the length of the electrode. The quartz 18 of the charge is supplied through the axial hole 16 of the electrode directly into the electric arc zone of the furnace at the bottom of the electrode. The remainder of the charge 20 with reducing agent is supplied on the outside of the electrode. The product 22 collects in the bottom of the furnace which is tapped from time to time in conventional manner to withdraw product. Reaction gases pass upwardly through the charge rich in reducing agent such as carbon outside the electrode where the SiO and Si gases are captured and returned to the reaction zone with the charge. In this embodiment, a carrying gas may be employed in conventional manner to maintain the hole in the electrode open.

Figure 2:
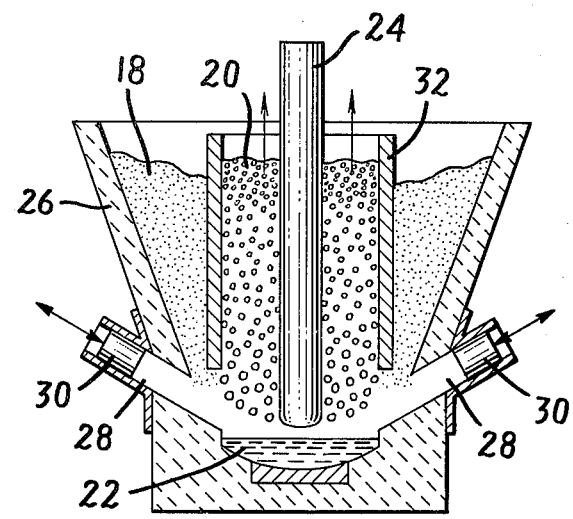

In FIG. 2, the electrode 24 is solid and the pot 26 of the furnace is provided with a plurality of side ports 28 adjacent the bottom of the electrode which are equipped with conventional mechanical feeding devices 30. A cylindrical separating member 32 is in position surrounding the electrode. In this embodiment, the carbon-rich charge is fed into the space between the electrode and separating member and the quartz is supplied to the space between the separating member and furance pot. The mechanical feeders 30 supply quartz to the electric arc zone of the furnace. Reaction gases pass upwardly through the carbon rich part of the charge.

Figure 3:
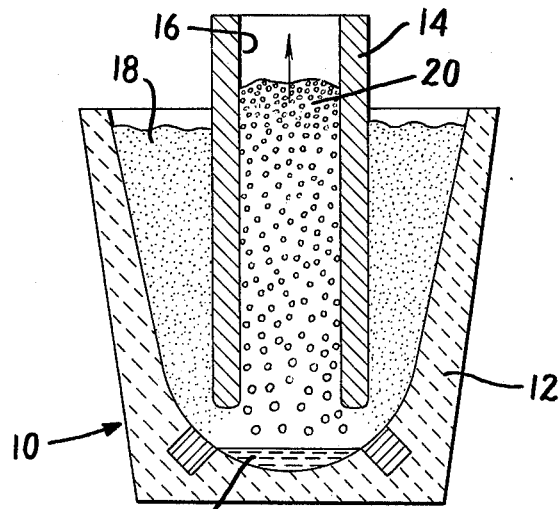

The furnace of FIG. 3 is similar to that of FIG. 1 except that the axial hole 16 in the electrode is made large enough to accept the supply of the carbon-rich part of the charge. Quartz is supplied outside the electrode and reaction gases pass up through the carbon-rich part of the charge.

Figure 4:
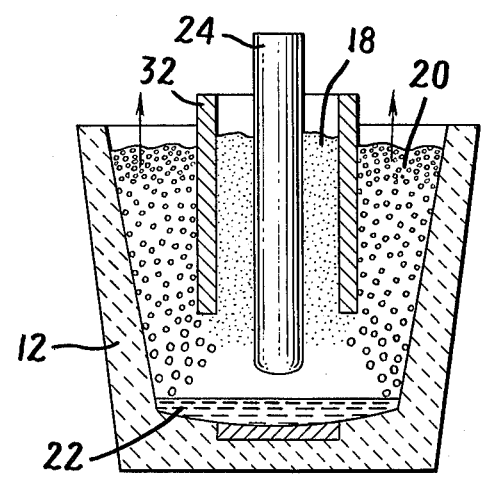

The furnace of FIG. 4 is similar to the furnace of FIG. 2 except there are no ports positioned in the pot of the furnace and the space between the separating member 32 and electrode is somewhat smaller. In this embodiment the quartz is fed into the space between the electrode and separating member while the carbon rich charge is fed into the space between the separating member and wall of the furnace pot. A portion of the reaction gases pass upwardly through the carbon rich charge.

Figure 5:
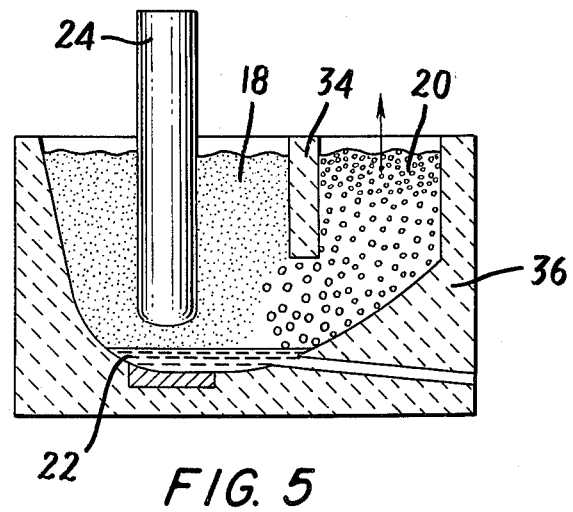

In the furnace of FIG. 5, a divider 34 is provided to separate a portion of the furnace 36 at one side from the electrode 24. The raw materials are separated and supplied asymmetrically in relation to the center line of the electrode. This figure also illustrates how the furnace volume can be divided into separate sectors around the electrode. The reaction gases pass upwardly through the carbon rich charge 20.

The furnaces illustrated in the drawings are generally of circular configuration but other geometric configurations may be employed and divided into sectors or zones rich in silicon oxide and sectors or zones rich in reducing reagents. The zones may have any desired geometric configuration and arrangement in the furnace pot which may have one or more electrodes therein. Other furnace embodiments for separating the silicon oxide materials from the reducing reagents in the charge will be obvious to those skilled in the art.

It will be understood that the claims are intended to cover all changes and modifications of the preferred embodiment of the invention herein chosen for the purpose of illustration which do not constitute departure from the spirit and scope of the invention.

What is claimed is:

1. In the method of producing silicon and silicon-containing alloy products in an electric furnace which involves the reduction of $SiO_2$ with carbon reducing reagent by energy supplied by one or more electrodes in the furnace, the improvement which comprises the steps of feeding at least a major amount of the reaction $SiO_2$ material in the charge into the furnace separate from the carbon reducing reagent in the charge and establishing at least two separate zones in the furnace one of which has a major amount of $SiO_2$ material and the other of which has a major amount of carbon reducing reagent and wherein reaction off gases from the reduction of $SiO_2$ pass through one or more zones rich in carbon reducing agent.

2. The method specified in claim 1 which includes the step of removing product from the lower part of the furnace.

3. The method specified in claim 1 which includes the step of feeding other metal oxides into the furnace along with the $SiO_2$ material.

4. The method specified in claim 1 which includes the step of feeding quartz into the furnace as the $SiO_2$ material.

5. The method specified in claim 1 which includes the step of feeding quartz sand into the furnace as the $SiO_2$ material to establish poor gas permeability and cause the majority of the furnace reaction gases to flow up through a zone rich in reducing agent.

6. The method specified in claim 1 which includes the step of feeding the $SiO_2$ material directly into the energy rich zone of the furnace.

7. The method specified in claim 1 which includes the step of establishing circular zones of $SiO_2$ material and circular zones of reducing reagent surrounding the electrode.

8. The method specified in claim 1 which includes the step of establishing sectors rich in $SiO_2$ material and separate sectors rich in reducing reagent around one or more electrodes.

9. The method specified in claim 1 which includes the step of feeding the $SiO_2$ material at a controlled rate corresponding to the rate at which energy is supplied to the furnace.

10. The method specified in claim 1 which includes the step of establishing zones in the furnace rich in $SiO_2$ material and rich in reducing reagent which zones are asymmetrical in relation to one or more electrodes.

* * * * *